(12) United States Patent
Jiang et al.

(10) Patent No.: US 10,659,220 B2
(45) Date of Patent: May 19, 2020

(54) METHOD AND SYSTEM FOR ENCRYPTING AND DECRYPTING TWO-DIMENSIONAL CODE MASK

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

(*) Notice: Subject to any disclaimer, the term of this patent is extended or adjusted under 35 U.S.C. 154(b) by 297 days.

(21) Appl. No.: 15/871,184

(22) Filed: Jan. 15, 2018

(65) Prior Publication Data

US 2018/0152290 A1 May 31, 2018

Related U.S. Application Data

(63) Continuation of application No. PCT/CN2016/090999, filed on Jul. 22, 2016.

(30) Foreign Application Priority Data

Jul. 28, 2015 (CN) .......................... 2015 1 0449982

(51) Int. Cl.
*H04L 9/08* (2006.01)
*H04L 9/06* (2006.01)
(Continued)

(52) U.S. Cl.
CPC ................ *H04L 9/08* (2013.01); *G06T 11/00* (2013.01); *G09C 5/00* (2013.01); *H04L 9/06* (2013.01);
(Continued)

(58) Field of Classification Search
CPC ....................................................... H04L 9/08
See application file for complete search history.

(56) References Cited

U.S. PATENT DOCUMENTS

2006/0284411 A1* 12/2006 Wu ........................... B44F 1/10
283/93
2009/0034723 A1* 2/2009 Yanazume ............... G09C 5/00
380/54
(Continued)

FOREIGN PATENT DOCUMENTS

| CN | 102243714 B | 1/2015 | |
|----|-------------|--------|---|
| CN | 103401679 B | 2/2015 | |
| WO | WO-2014091252 A1 * | 6/2014 | ............ G06F 21/36 |

*Primary Examiner* — Simon P Kanaan (57) ABSTRACT

The invention provides a method and system for encrypting and decrypting two-dimensional code mask. The method comprises: generating a target two-dimensional code containing a function pattern and an identification, an initial mask pattern and a key by a two-dimensional code generating device; sending the identification, the initial mask pattern and the key to a server by the two-dimensional code generating device; sending the identification to the server by the two-dimensional code decoding device; receiving the identification by the server; sending the key and the initial mask pattern to the two-dimensional code decoding device by the server according to the identification; receiving by the two-dimensional code decoding device the key and the initial mask pattern sent by the server; and decrypting the encrypted two-dimensional code by the two-dimensional code decoding device according to the key and the initial mask pattern to acquire the target two-dimensional code. The system has high security.

10 Claims, 2 Drawing Sheets

(51) Int. Cl.
*G09C 5/00* (2006.01)
*H04N 1/32* (2006.01)
*G06T 11/00* (2006.01)

(52) U.S. Cl.
CPC ....... *H04L 9/0825* (2013.01); *H04N 1/32144* (2013.01); *H04L 2209/04* (2013.01)

(56) References Cited

U.S. PATENT DOCUMENTS

| | | | | |
|---|---|---|---|---|
| 2010/0031014 | A1* | 2/2010 | Senda | G09C 5/00 713/150 |
| 2014/0040941 | A1* | 2/2014 | Rosenberg; Sergei | G06Q 20/32 725/28 |
| 2014/0223175 | A1* | 8/2014 | Bhatnagar | G09C 5/00 713/159 |
| 2018/0367887 | A1* | 12/2018 | Vilhelmsen | H04L 9/3271 |

\* cited by examiner

METHOD AND SYSTEM FOR ENCRYPTING AND DECRYPTING TWO-DIMENSIONAL CODE MASK

CROSS REFERENCE TO RELATED APPLICATIONS

The present application is a Continuation Application of PCT Application No. PCT/CN2016/090999 filed on Jul. 22, 2016, which claims the benefit of Chinese Patent Application No. 201510449982.7 filed on Jul. 28, 2015. All the above are hereby incorporated by reference.

FIELD OF THE INVENTION

The invention relates to the field of two-dimensional code encrypting technology, and in particular, to a method and system for encrypting and decrypting two-dimensional code mask.

BACKGROUND OF THE INVENTION

Two-dimensional code is being more and more widely used. However, at the same time of bringing convenience to people, hidden security risks also gradually arise for the two-dimensional code. For example, incidents such as stealing of cell-phone balance occur from time to time after the two-dimensional code is scanned by the cell-phone Chinese invention patent publication No. CN102243714B discloses a two-dimensional code encrypting system, in which a user terminal device represents a user ID by a first area of a two-dimensional code and represents a user password by a second area of the two-dimensional code; a client computer receives and decodes by the two-dimensional code sent by the user terminal device so as to obtain the ID and the password corresponding to the two-dimensional code, and sends the decoded ID and the password to a management server; the management server verifies whether the received ID and password are consistent with the data stored in a user database, and sends the verification result to the client computer; and the client computer receives the verification result sent by the management server. Although the user ID and the user password are added in the designated areas of the two-dimensional code, the attacker can regenerate or modify the data by intercepting the target two-dimensional code image and reserving the areas where the user ID and password are located, so that the user ID and the password keep the same as the original image. In this situation, the server cannot identify the true from the false, and thus the security attack cannot be tackled.

Chinese invention patent publication No. CN103401679B discloses a two-dimensional code encrypting and decoding method, in which the two-dimensional code is encrypted and decoded in a way of symmetric encryption, one two-dimensional code corresponds to one identification; a ciphertext is formed by adding an identification in front of or behind the encrypted original information, and the ciphertext is used to generate a two-dimensional code; the two-dimensional code can be generated only after the original information is encrypted. The two-dimensional code is scanned to obtain the ciphertext composed of the identification and the encrypted original information. There is no protection measure for the encrypting mode database. Once the encrypting mode database is leaked, it can be easily attacked by the attacker.

SUMMARY OF THE INVENTION

Technical Problem

The technical problem to be solved by the invention is to provide a method and system for encrypting and decrypting two-dimensional code mask with high security.

Technical Solution

In order to solve the above technical problem, the invention provides the following technical solutions.

A method for encrypting and decrypting two-dimensional code mask is provided, which includes:
generating a target two-dimensional code containing a function pattern and an identification, an initial mask pattern and a key by a two-dimensional code generating device;
sending the identification and the key to a server by the two-dimensional code generating device;
receiving and storing the identification and the key by the server;
encrypting the initial mask pattern by the two-dimensional code generating device using the key and then embedding the target two-dimensional code into the encrypted mask pattern so as to acquire an encrypted two-dimensional code;
acquiring and decoding the encrypted two-dimensional code by a two-dimensional code decoding device so as to acquire the function pattern and the identification of the two-dimensional code;
sending the identification to the server by the two-dimensional code decoding device;
receiving the identification by the server;
sending the key to the two-dimensional code decoding device by the server according to the identification;
receiving by the two-dimensional code decoding device the key sent by the server;
generating the initial mask pattern by the two-dimensional code decoding device according to the function pattern and the identification; and
decrypting the encrypted two-dimensional code by the two-dimensional code decoding device according to the key and the initial mask pattern so as to acquire the target two-dimensional code.

The invention has the following advantageous effects: a generating rule of generating the initial mask pattern according to the function pattern of the two-dimensional code and encrypting rules for encrypting the initial mask pattern using the key and encrypting the target two-dimensional code using the encrypted initial mask pattern are pre-stored in the two-dimensional code generating device and the two-dimensional code decoding device, and the identification is used to identify the target two-dimensional code and the key. The generation of the initial mask pattern, the encryption of the initial mask pattern using the key and the encryption of the target two-dimensional code using the encrypted initial mask pattern are performed inside the two-dimensional code generating device and the two-dimensional code decoding device, and only the identification and the key are transmitted between the two-dimensional code generating device and the server as well as between the two-dimensional code decoding device and the server, thus presenting high security and less loads for the server.

A method for encrypting and decrypting two-dimensional code mask is provided, which includes:

generating a target two-dimensional code containing an identification, an initial mask pattern and a key by a two-dimensional code generating device;

sending the identification, the initial mask pattern and the key to a server by the two-dimensional code generating device;

receiving and storing the identification, the initial mask pattern and the key by the server;

encrypting the initial mask pattern by the two-dimensional code generating device using the key and then embedding the target two-dimensional code into the encrypted mask pattern so as to acquire an encrypted two-dimensional code;

acquiring and decoding the encrypted two-dimensional code by a two-dimensional code decoding device so as to acquire the identification;

sending the identification to the server by the two-dimensional code decoding device;

receiving the identification by the server;

sending the key and the initial mask pattern to the two-dimensional code decoding device by the server according to the identification;

receiving by the two-dimensional code decoding device the key and the initial mask pattern sent by the server; and decrypting the encrypted two-dimensional code by the two-dimensional code decoding device according to the key and the initial mask pattern so as to acquire the target two-dimensional code.

The invention has the following advantageous effects: encrypting rules for encrypting the initial mask pattern using the key and encrypting the target two-dimensional code using the encrypted initial mask pattern are pre-stored in the two-dimensional code generating device and the two-dimensional code decoding device, and the identification is used to identify the target two-dimensional code, the initial mask pattern and the key. The encryption of the initial mask pattern using the key and the encryption of the target two-dimensional code using the encrypted initial mask pattern are performed inside the two-dimensional code generating device and the two-dimensional code decoding device, and only the identification, the initial mask pattern and the key are transmitted between the two-dimensional code generating device and the server as well as between the two-dimensional code decoding device and the server, thus presenting high security.

A system for encrypting and decrypting two-dimensional code mask is provided, which includes: a two-dimensional code generating device, a two-dimensional code decoding device and a server, wherein the two-dimensional code generating device includes a first generating module, a first sending module, an encrypting module and an embedding module, the two-dimensional code decoding device includes an acquiring module, a second sending module, a third receiving module, a second generating module and a decrypting module, and the server includes a first receiving module, a second receiving module and a third sending module;

the first generating module is configured for generating a target two-dimensional code containing a function pattern and an identification, an initial mask pattern and a key by the two-dimensional code generating device;

the first sending module is configured for sending the identification and the key to the server by the two-dimensional code generating device;

the first receiving module is configured for receiving and storing the identification and the key by the server;

the encrypting module is configured for encrypting the initial mask pattern by the two-dimensional code generating device using the key and then embedding the target two-dimensional code into the encrypted mask pattern so as to acquire an encrypted two-dimensional code;

the acquiring module is configured for acquiring and decoding the encrypted two-dimensional code by the two-dimensional code decoding device so as to acquire the function pattern and the identification of the two-dimensional code;

the second sending module is configured for sending the identification to the server by the two-dimensional code decoding device;

the second receiving module is configured for receiving the identification by the server;

the third sending module is configured for sending the key to the two-dimensional code decoding device by the server according to the function pattern information of the two-dimensional code and the identification;

the third receiving module is configured for receiving by the two-dimensional code decoding device the key sent by the server;

the second generating module is configured for generating an initial mask pattern by the two-dimensional code decoding device according to the function pattern and the identification; and the decrypting module is configured for decrypting the encrypted two-dimensional code by the two-dimensional code decoding device according to the key and the initial mask pattern so as to acquire the target two-dimensional code.

The invention has the following advantageous effects: the identification and the key are sent by the two-dimensional code generating device to the server, the identification is sent to the server by the two-dimensional code decoding device, and the key is sent to the two-dimensional code decoding device by the server according to the identification. The generation and encryption of the initial mask pattern and the encryption of the target two-dimensional code are performed inside the two-dimensional code generating device and the two-dimensional code decoding device, and only the identification and the key are transmitted among the two-dimensional code generating device, the server and the two-dimensional code decoding device, thus presenting high security and less loads for the server. The target two-dimensional code corresponding to each identification may be unique, or may also be in batch, which is convenient for use.

A system for encrypting and decrypting two-dimensional code mask is provided, which includes: a two-dimensional code generating device, a two-dimensional code decoding device and a server, wherein the two-dimensional code generating device includes a generating module, a first sending module, an encrypting module and an embedding module, the two-dimensional code decoding device includes an acquiring module, a second sending module, a third receiving module, and a decrypting module, and the server includes a first receiving module, a second receiving module and a third sending module;

the generating module is configured for generating a target two-dimensional code containing an identification, an initial mask pattern and a key by the two-dimensional code generating device;

the first sending module is configured for sending the identification, the initial mask pattern and the key to the server by the two-dimensional code generating device;

the encrypting module is configured for encrypting the initial mask pattern by the two-dimensional code generating device using the key;

the embedding module is configured for encrypting the initial mask pattern by the two-dimensional code generating device using the key and then embedding the target two-dimensional code into the encrypted mask pattern so as to acquire an encrypted two-dimensional code;

the acquiring module is configured for acquiring and decoding the encrypted two-dimensional code by the two-dimensional code decoding device so as to acquire the identification;

the second sending module is configured for sending the identification to the server by the two-dimensional code decoding device;

the third receiving module is configured for receiving by the two-dimensional code decoding device the key and the initial mask pattern sent by the server;

the decrypting module is configured for decrypting the encrypted two-dimensional code by the two-dimensional code decoding device according to the key and the initial mask pattern so as to acquire the target two-dimensional code;

the first receiving module is configured for receiving and storing the identification, the initial mask pattern and the key by the server;

the second receiving module is configured for receiving the identification by the server; and the third sending module is configured for sending the key and the initial mask pattern to the two-dimensional code decoding device by the server according to the identification.

Advantageous Effects

The invention has the following advantageous effects: the identification, the initial mask pattern and the key are sent to the server by the two-dimensional code generating device, the identification is sent to the server by the two-dimensional code decoding device, and the initial mask pattern and the key are sent to the two-dimensional code decoding device by the server according to the identification. The encryption of the initial mask pattern and the encryption of the target two-dimensional code are performed inside the two-dimensional code generating device and the two-dimensional code decoding device, and only the identification, the initial mask pattern and the key are transmitted among the two-dimensional code generating device, the server and the two-dimensional code decoding device, thus presenting high security. The target two-dimensional code corresponding to each identification may be unique, or may also be in batch, which is convenient for use.

DETAILED DESCRIPTION OF THE PREFERRED EMBODIMENTS

In order to illustrate the technical solutions, the objects and effects of the invention in detail, embodiments are described below in conjunction with the accompanying drawings.

The main concept of the invention lies in that only an identification and a key, or an initial mask pattern are transmitted among a two-dimensional code generating device, a server and a two-dimensional code decoding device with high security.

The specific embodiments of the invention are described as follows.

Figure 1:
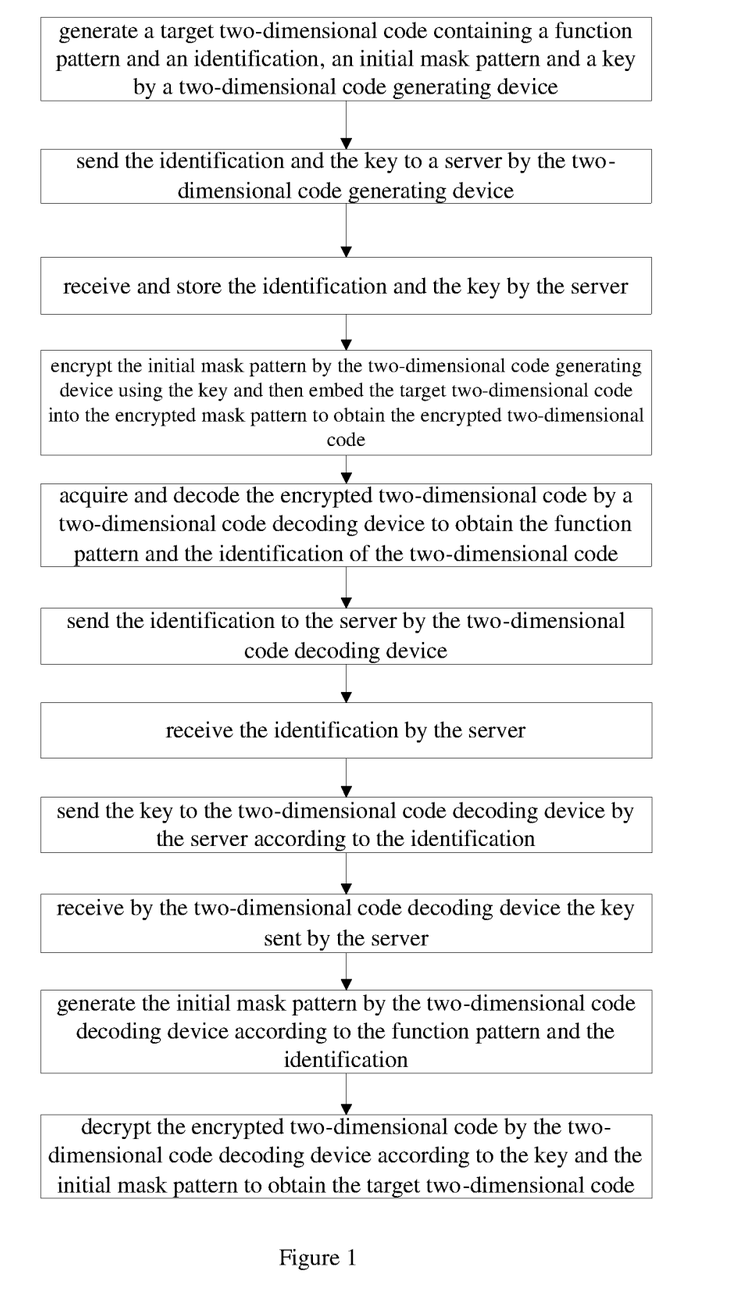
FIG. 1 is a flowchart of a method for encrypting two-dimensional code mask according to a first embodiment of the invention.

Referring to FIG. 1, a method for encrypting and decrypting two-dimensional code mask is provided, which includes:

generating a target two-dimensional code containing a function pattern and an identification, an initial mask pattern and a key by a two-dimensional code generating device;

sending the identification and the key to a server; by the two-dimensional code generating device receiving and storing the identification and the key by the server;

encrypting the initial mask pattern by the two-dimensional code generating device using the key and then embedding the target two-dimensional code into the encrypted mask pattern so as to acquire an encrypted two-dimensional code;

acquiring and decoding the encrypted two-dimensional code by a two-dimensional code decoding device so as to acquire the function pattern and the identification of the two-dimensional code;

sending the identification to the server by the two-dimensional code decoding device;

receiving the identification by the server;

sending the key to the two-dimensional code decoding device by the server according to the identification;

receiving by the two-dimensional code decoding device the key sent by the server;

generating the initial mask pattern by the two-dimensional code decoding device according to the function pattern and the identification; and decrypting the encrypted two-dimensional code by the two-dimensional code decoding device according to the key and the initial mask pattern so as to acquire the target two-dimensional code.

Figure 2:
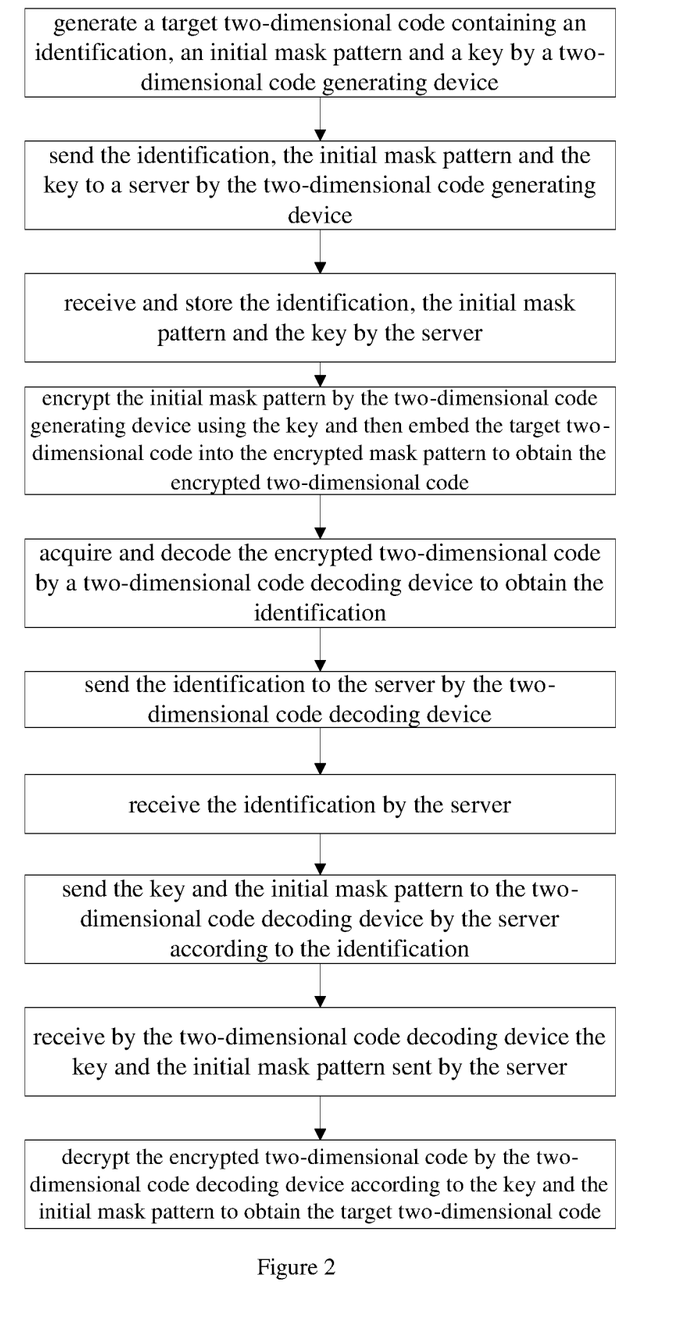
FIG. 2 is a flowchart of a method for encrypting two-dimensional code mask according to a second embodiment of the invention.

Referring to FIG. 2, a method for encrypting and decrypting two-dimensional code mask is provided, which includes:

generating a target two-dimensional code containing an identification, an initial mask pattern and a key by a two-dimensional code generating device;

sending the identification, the initial mask pattern and the key to a server by the two-dimensional code generating device;

receiving and storing the identification, the initial mask pattern and the key by the server;

encrypting the initial mask pattern by the two-dimensional code generating device using the key and then embedding the target two-dimensional code into the encrypted mask pattern so as to acquire an encrypted two-dimensional code;

acquiring and decoding the encrypted two-dimensional code by a two-dimensional code decoding device so as to acquire the identification;

sending the identification to the server by the two-dimensional code decoding device;

receiving the identification by the server;
sending the key and the initial mask pattern to the two-dimensional code decoding device by the server according to the identification;
receiving by the two-dimensional code decoding device the key and the initial mask pattern sent by the server; and
decrypting the encrypted two-dimensional code by the two-dimensional code decoding device according to the key and the initial mask pattern so as to acquire the target two-dimensional code.

Further, the method further includes establishing a secure channel between the two-dimensional code generating device and the server, specifically including:
generating a public key pair and a private key pair by the server and sending the public key pair to the two-dimensional code generating device;
receiving the public key pair by the two-dimensional code generating device;
encrypting an identity ID and a work key by the two-dimensional code generating device using the public key pair and sending the encrypted ID and the encrypted work key to the server;
receiving the encrypted ID and the encrypted work key by the server;
decrypting the encrypted identity ID and the encrypted work key by the server using the private key pair so as to acquire the identity ID and the work key.

The work key is used for encrypting and decrypting data transmission between the two-dimensional code generating device and the server so as to establish the secure channel.

As can be seen from the above description, the secure channel is established between the two-dimensional code generating device and the server by means of a public key pair, a private key pair and a work key, the identity ID and the work key transmitted between the two-dimensional code generating device and the server are encrypted using the public key pair, and the private key pair is necessary for the decryption of the encrypted identity ID and the encrypted work key. Therefore, even if the attacker intercepts the encrypted identity ID and the encrypted work key and knows the public key, it would also be very difficult to decrypt the encrypted identity ID and the encrypted work key, thus presenting high security.

Further, the method further includes establishing a secure channel between the two-dimensional code decoding device and the server, specifically including:
generating a public key pair and a private key pair by the server and sending the public key pair to the two-dimensional code decoding device;
receiving the public key pair by the two-dimensional code decoding device;
encrypting an identity ID and a work key by the two-dimensional code decoding device using the public key pair and sending the encrypted identity ID and the encrypted work key to the server;
receiving the encrypted identity ID and the encrypted work key by the server;
decrypting the encrypted identity ID and the encrypted work key by the server using the private key pair so as to acquire the identity ID and the work key.

The work key is used for encrypting and decrypting data transmission between the two-dimensional code decoding device and the server so as to establish the secure channel.

As can be seen from the above description, the secure channel is established between the two-dimensional code decoding device and the server by means of a public key pair, a private key pair and a work key, the identity ID and the work key transmitted between the two-dimensional code decoding device and the server are encrypted using the public key pair, and the private key pair is necessary for the decryption of the encrypted identity ID and the encrypted work key. Therefore, even if the attacker intercepts the encrypted identity ID and the encrypted work key and knows the public key, it would also be very difficult to decrypt the encrypted identity ID and the encrypted work key, thus presenting high security.

Further, "encrypting the initial mask pattern by the two-dimensional code generating device using the key and then embedding the target two-dimensional code into the encrypted mask pattern so as to acquire the encrypted two-dimensional code" specifically includes:
encrypting the initial mask pattern by the two-dimensional code generating device using the key so as to acquire an encrypted mask pattern;
performing an exclusive-OR operation on the encrypted mask pattern and the target two-dimensional code by the two-dimensional code generating device so as to acquire an encrypted two-dimensional code;

"decrypting the encrypted two-dimensional code by the two-dimensional code decoding device according to the key and the initial mask pattern so as to acquire the target two-dimensional code" specifically includes:
encrypting the initial mask pattern by the two-dimensional code decoding device using the key so as to acquire an encrypted mask pattern;
performing an exclusive-OR operation on the encrypted mask pattern and the encrypted two-dimensional code by the two-dimensional code decoding device so as to acquire the target two-dimensional code.

As can be seen from the above description, the initial mask pattern is encrypted by the two-dimensional code generating device using the key, and then an exclusive-OR operation is performed by the two-dimensional code generating device on the encrypted mask pattern and the target two-dimensional code to acquire the encrypted two-dimensional code; the initial mask pattern is encrypted by the two-dimensional code decoding device using the key, and then an exclusive-OR operation is performed by the two-dimensional code decoding device on the encrypted mask pattern and the encrypted two-dimensional code to acquire the target two-dimensional code. The encrypting process and the decrypting process of the target two-dimensional code are the same operational procedure. The two-dimensional code can be successfully encrypted and decrypted as long as the protocol of the encrypting rule is stored in the two-dimensional code generating device and the two-dimensional code decoding device.

Further, the initial mask pattern is consistent with the target two-dimensional code in size, areas of the mask pattern corresponding to the function patterns of the target two-dimensional code are set to be of a light color, and the function patterns of the target two-dimensional code include a position detection pattern, a position detection pattern separator, a positioning pattern, a correction pattern, an auxiliary correction pattern and an identification pattern.

"encrypting the initial mask pattern by the two-dimensional code generating device using the key" specifically includes:
sequentially skipping the areas of the mask pattern corresponding to the function patterns of the target two-dimension code, extracting bit data of the initial mask pattern to form initial data strings, and recording the position and the number of the skipped areas;

encrypting the initial data strings using the key to acquire encrypted data strings; and sequentially splicing the encrypted data strings and the function areas together to form the encrypted mask pattern according to the position and the number of skipped areas.

As can be seen from the above description, the initial mask pattern as the encrypting pattern of the target two-dimensional code is consistent with the target two-dimensional code in size and can avoid the function patterns of the target two-dimensional code. With an appropriately designed structure, identification, positioning and correction of the target two-dimensional code and the encrypted two-dimensional code are facilitated. The areas corresponding to the function patterns of the target two-dimensional code are required to be skipped in encrypting the initial mask pattern, for avoiding that the positioning pattern, the correction pattern, the auxiliary correction pattern and the identification pattern of the target two-dimensional code from are encrypted and that the target two-dimensional code cannot be identified. The method is reasonably devised and facilitates the identification, positioning and correction of the target two-dimensional code.

Further, the method further includes: presetting a time threshold and recording a storage duration of the key in the server; not sending the key to the two-dimensional code decoding device by the server, if the storage duration exceeds the time threshold.

As can be seen from the above description, the time threshold is preset in the server; if the storage duration of the key exceeds the time threshold, it means that the key is outdated and the target two-dimensional code has failed, then the key is not sent by the server to the two-dimensional code decoding device, and the encrypted two-dimensional code cannot be decrypted by the two-dimensional code decoding device. The method is reasonably devised, facilitates setting the period of validity of the target two-dimensional code, and is convenient for use.

Referring to FIG. 1, a first embodiment of the invention is described as follows.

A method for encrypting and decrypting two-dimensional code mask is provided, which includes:

establishing a secure channel between a two-dimensional code generating device and a server, specifically including:

generating a public key pair and a private key pair by the server and sending the public key pair to the two-dimensional code generating device;

receiving the public key pair by the two-dimensional code generating device;

encrypting an identity ID and a work key by the two-dimensional code generating device using the public key pair and sending the encrypted identity ID and the encrypted work key to the server;

receiving the encrypted identity ID and the encrypted work key by the server;

decrypting the encrypted identity ID and the encrypted work key by the server using the private key pair so as to acquire the identity ID and the work key;

generating a target two-dimensional code containing a function pattern and an identification, an initial mask pattern and a key by the two-dimensional code generating device;

sending the identification and the key to the server by the two-dimensional code generating device;

receiving and storing the identification and the key by the server;

encrypting the initial mask pattern by the two-dimensional code generating device using the key and then embedding the target two-dimensional code into the encrypted mask pattern so as to acquire an encrypted two-dimensional code, specifically including:

encrypting the initial mask pattern by the two-dimensional code generating device using the key so as to acquire an encrypted mask pattern;

performing an exclusive-OR operation on the encrypted mask pattern and the target two-dimensional code by the two-dimensional code generating device so as to acquire an encrypted two-dimensional code;

establishing a secure channel between the two-dimensional code decoding device and the server, specifically including:

generating a public key pair and a private key pair by the server and sending the public key pair to the two-dimensional code decoding device;

receiving the public key pair by the two-dimensional code decoding device;

encrypting an identity ID and a work key by the two-dimensional code decoding device using the public key pair and sending the encrypted identity ID and the encrypted work key to the server;

receiving the encrypted identity ID and the encrypted work key by the server;

decrypting the encrypted identity ID and the encrypted work key by the server using the private key pair so as to acquire the identity ID and the work key;

acquiring and decoding the encrypted two-dimensional code by the two-dimensional code decoding device to acquire the function pattern and the identification;

sending the identification to the server by the two-dimensional code decoding device;

receiving the identification by the server;

sending the key to the two-dimensional code decoding device by the server according to the identification;

receiving by the two-dimensional code decoding device the key sent by the server;

generating the initial mask pattern by the two-dimensional code decoding device according to the function pattern and the identification; and "decrypting the encrypted two-dimensional code by the two-dimensional code decoding device according to the key and the initial mask pattern so as to acquire the target two-dimensional code" specifically includes:

encrypting the initial mask pattern by the two-dimensional code decoding device using the key to acquire an encrypted mask pattern; and performing an exclusive-OR operation on the encrypted mask pattern and the encrypted two-dimensional code by the two-dimensional code decoding device to acquire the target two-dimensional code.

Referring to FIG. 2, a second embodiment of the invention is described as follows.

A method for encrypting and decrypting two-dimensional code mask is provided, which includes:

establishing a secure channel between a two-dimensional code generating device and a server, specifically including:

generating a public key pair and a private key pair by the server and sending the public key pair to the two-dimensional code generating device;

receiving the public key pair by the two-dimensional code generating device;

encrypting an identity ID and a work key by the two-dimensional code generating device using the public key pair and sending the encrypted identity ID and the encrypted work key to the server;
receiving the encrypted identity ID and the encrypted work key by the server;
decrypting the encrypted identity ID and the encrypted work key by the server using the private key pair so as to acquire the identity ID and the work key;
generating by the two-dimensional code generating device a target two-dimensional code containing an identification, an initial mask pattern and a key, wherein the initial mask pattern is consistent with the target two-dimensional code in size, areas of the mask pattern corresponding to the function patterns of the target two-dimensional code are set to be of a light color, and the function patterns of the target two-dimensional code include a position detection pattern, a position detection pattern separator, a positioning pattern, a correction pattern, an auxiliary correction pattern and an identification pattern;
sending the identification, the initial mask pattern and the key to the server by the two-dimensional code generating device;
receiving and storing the identification, the initial mask pattern and the key by the server;
"encrypting the initial mask pattern by the two-dimensional code generating device using the key and then embedding the target two-dimensional code into the encrypted mask pattern so as to acquire an encrypted two-dimensional code" specifically includes:
encrypting the initial mask pattern by the two-dimensional code generating device using the key so as to acquire an encrypted mask pattern;
sequentially skipping the areas of the mask pattern corresponding to the function patterns of the target two-dimension code, extracting bit data of the initial mask pattern to form initial data strings, and recording the position and the number of the skipped areas;
encrypting the initial data strings using the key to acquire encrypted data strings;
sequentially splicing the encrypted data strings and the function areas together to form the encrypted mask pattern according to the position and the number of skipped areas;
performing an exclusive-OR operation on the encrypted mask pattern and the target two-dimensional code by the two-dimensional code generating device so as to acquire the encrypted two-dimensional code;
"establishing a secure channel between the two-dimensional code decoding device and the server" specifically includes:
generating a public key pair and a private key pair by the server and sending the public key pair to the two-dimensional code decoding device;
receiving the public key pair by the two-dimensional code decoding device;
encrypting an identity ID and a work key by the two-dimensional code decoding device using the public key pair and sending the encrypted ID and the encrypted work key to the server;
receiving by the server the encrypted identity ID and the encrypted work key;
decrypting the encrypted identity ID and the encrypted work key by the server using the private key pair so as to acquire the identity ID and the work key;
acquiring and decoding the encrypted two-dimensional code by the two-dimensional code decoding device to acquire the identification;
sending the identification to the server by the two-dimensional code decoding device;
receiving the identification by the server;
presetting a time threshold in the server and recording a storage duration of the key in the server; not sending the key to the two-dimensional code decoding device by the server, if the storage duration exceeds the time threshold; sending the key and the initial mask pattern to the two-dimensional code decoding device by the server according to the identification, if the storage time does not exceed the time threshold;
receiving by the two-dimensional code decoding device the key and the initial mask pattern sent by the server; and
"decrypting the encrypted two-dimensional code by the two-dimensional code decoding device according to the key and the initial mask pattern to acquire the target two-dimensional code" specifically includes:
encrypting the initial mask pattern by the two-dimensional code decoding device using the key to acquire the encrypted mask pattern;
sequentially skipping the areas of the mask pattern corresponding to the function patterns of the target two-dimension code, extracting bit data of the initial mask pattern to form initial data strings, and recording the position and the number of the skipped areas;
encrypting the initial data strings using the key to acquire the encrypted data strings;
sequentially splicing the encrypted data strings and the function areas together to form the encrypted mask pattern according to the position and the number of skipped areas;
performing an exclusive-OR operation on the encrypted mask pattern and the encrypted two-dimensional code by the two-dimensional code decoding device to acquire the target two-dimensional code.

A system for encrypting and decrypting two-dimensional code mask is provided, which includes: a two-dimensional code generating device, a two-dimensional code decoding device and a server, wherein the two-dimensional code generating device includes a first generating module, a first sending module, an encrypting module and an embedding module, the two-dimensional code decoding device includes an acquiring module, a second sending module, a third receiving module, a second generating module and a decrypting module, and the server includes a first receiving module, a second receiving module and a third sending module;

the first generating module is configured for generating a target two-dimensional code containing a function pattern and an identification, an initial mask pattern and a key by the two-dimensional code generating device;
the first sending module is configured for sending the identification and the key to the server by the two-dimensional code generating device;
the first receiving module is configured for receiving and storing the identification and the key by the server;
the encrypting module is configured for encrypting the initial mask pattern by the two-dimensional code generating device using the key and then embedding the target two-dimensional code into the encrypted mask pattern to acquire an encrypted two-dimensional code;
the acquiring module is configured for acquiring and decoding the encrypted two-dimensional code by the two-dimensional code decoding device to acquire the function pattern and the identification of the two-dimensional code;

the second sending module is configured for sending the identification to the server by the two-dimensional code decoding device;

the second receiving module is configured for receiving the identification by the server;

the third sending module is configured for sending the key to the two-dimensional code decoding device by the server according to the identification;

the third receiving module is configured for receiving by the two-dimensional code decoding device the key sent by the server;

the second generating module is configured for generating the initial mask pattern by the two-dimensional code decoding device according to the function pattern and the identification; and the decrypting module is configured for decrypting the encrypted two-dimensional code by the two-dimensional code decoding device according to the key and the initial mask pattern so as to acquire the target two-dimensional code.

A third embodiment of the invention is described as follows.

A system for encrypting and decrypting two-dimensional code mask is provided, which includes: a two-dimensional code generating device, a two-dimensional code decoding device and a server, wherein the two-dimensional code generating device includes a first generating module, a first sending module, an encrypting module and an embedding module, the two-dimensional code decoding device includes an acquiring module, a second sending module, a third receiving module, a second generating module and a decrypting module, and the server includes a first receiving module, a second receiving module and a third sending module;

the first generating module is configured for generating a target two-dimensional code containing a function pattern and an identification, an initial mask pattern and a key by the two-dimensional code generating device;

the first sending module is configured for sending the identification and the key to the server by the two-dimensional code generating device;

the first receiving module is configured for receiving and storing the identification and the key by the server;

the encrypting module is configured for encrypting the initial mask pattern by the two-dimensional code generating device using the key and then embedding the target two-dimensional code into the encrypted mask pattern so as to acquire the encrypted two-dimensional code;

the acquiring module is configured for acquiring and decoding the encrypted two-dimensional code by the two-dimensional code decoding device so as to acquire the function pattern and the identification of the two-dimensional code;

the second sending module is configured for sending the identification to the server by the two-dimensional code decoding device;

the second receiving module is configured for receiving the identification by the server;

the third sending module is configured for sending the key to the two-dimensional code decoding device by the server according to the identification;

the third receiving module is configured for receiving by the two-dimensional code decoding device the key sent by the server;

the second generating module is configured for generating the initial mask pattern by the two-dimensional code decoding device according to the function pattern and the identification; and the decrypting module is configured for decrypting the encrypted two-dimensional code by the two-dimensional code decoding device according to the key and the initial mask pattern to acquire the target two-dimensional code.

A system for encrypting and decrypting two-dimensional code mask is provided, which includes: a two-dimensional code generating device, a two-dimensional code decoding device and a server, wherein the two-dimensional code generating device includes a generating module, a first sending module, an encrypting module and an embedding module, the two-dimensional code decoding device includes an acquiring module, a second sending module, a third receiving module, and a decrypting module, and the server includes a first receiving module, a second receiving module and a third sending module;

the generating module is configured for generating a target two-dimensional code containing an identification, an initial mask pattern and a key by the two-dimensional code generating device;

the first sending module is configured for sending the identification, the initial mask pattern and the key to the server by the two-dimensional code generating device;

the encrypting module is configured for encrypting the initial mask pattern by the two-dimensional code generating device using the key;

the embedding module is configured for encrypting the initial mask pattern by the two-dimensional code generating device using the key and then embedding the target two-dimensional code into the encrypted mask pattern so as to acquire an encrypted two-dimensional code;

the acquiring module is configured for acquiring and decoding the encrypted two-dimensional code by the two-dimensional code decoding device to acquire the identification;

the second sending module is configured for sending the identification to the server by the two-dimensional code decoding device;

the third receiving module is configured for receiving by the two-dimensional code decoding device the key and the initial mask pattern sent by the server;

the decrypting module is configured for decrypting the encrypted two-dimensional code by the two-dimensional code decoding device according to the key and the initial mask pattern to acquire the target two-dimensional code;

the first receiving module is configured for receiving and storing the identification, the initial mask pattern and the key by the server;

the second receiving module is configured for receiving the identification by the server; and the third sending module is configured for sending the key and the initial mask pattern to the two-dimensional code decoding device by the server according to the identification.

A fourth embodiment of the invention is described as follows.

A system for encrypting and decrypting two-dimensional code mask is provided, which includes: a two-dimensional code generating device, a two-dimensional code decoding device and a server, wherein the two-dimensional code generating device includes a generating module, a first sending module, an encrypting module and an embedding module, the two-dimensional code decoding device includes an acquiring module, a second sending module, a third receiving module, and a decrypting module, and the server includes a first receiving module, a second receiving module and a third sending module;

the generating module is configured for generating a target two-dimensional code containing an identification, an initial mask pattern and a key by the two-dimensional code generating device;

the first sending module is configured for sending the identification, the initial mask pattern and the key to the server by the two-dimensional code generating device;

the encrypting module is configured for encrypting the initial mask pattern by the two-dimensional code generating device using the key;

the embedding module is configured for encrypting the initial mask pattern by the two-dimensional code generating device using the key and then embedding the target two-dimensional code into the encrypted mask pattern so as to acquire an encrypted two-dimensional code;

the acquiring module is configured for acquiring and decoding the encrypted two-dimensional code by the two-dimensional code decoding device to acquire the identification;

the second sending module is configured for sending the identification to the server by the two-dimensional code decoding device;

the third receiving module is configured for receiving by the two-dimensional code decoding device the key and the initial mask pattern sent by the server;

the decrypting module is configured for decrypting the encrypted two-dimensional code by the two-dimensional code decoding device according to the key and the initial mask pattern to acquire the target two-dimensional code;

the first receiving module is configured for receiving and storing the identification, the initial mask pattern and the key by the server;

the second receiving module is configured for receiving the identification by the server; and the third sending module is configured for sending the key and the initial mask pattern to the two-dimensional code decoding device by the server according to the identification.

In summary, in the method and system for encrypting and decrypting two-dimensional code mask provided by the invention, a secure channel is established between the two-dimensional code generating device and the server as well as between the two-dimensional code decoding device and the server, thereby improving the security of system application environment. Only the identification and the key, or the initial mask pattern are transmitted between the two-dimensional code generating device and the server as well as between the two-dimensional code decoding device and the server. The generation of the initial mask pattern and the encryption of the target two-dimensional code are performed inside the two-dimensional code generating device, the decrypting process of the encrypted two-dimensional code is performed inside the two-dimensional code decoding device, and the two-dimensional code decoding device can also generate the initial mask pattern according to the function pattern information of the two-dimensional code, thus presenting high security. The time validity of the key can be set in the server, which is convenient for use. The identification is used to identify the target two-dimensional code, the key, the function pattern information of the two-dimensional code or the initial mask pattern. The target two-dimensional code corresponding to each identification may be unique, or may also be in batch. The areas corresponding to the function patterns of the target two-dimensional code are skipped for the encrypted area of the initial mask pattern, which is convenient for the identification, positioning and correction of the target two-dimensional code and the encrypted two-dimensional code. The system has high security, the server has less loads, and the use is convenient.

What is claimed is:

1. A method for encrypting and decrypting two-dimensional code mask, characterized by comprising:

generating a target two-dimensional code containing a function pattern and an identification, an initial mask pattern and a key by a two-dimensional code generating device;

sending the identification and the key to a server by the two-dimensional code generating device;

receiving and storing the identification and the key by the server;

encrypting the initial mask pattern by the two-dimensional code generating device using the key and then embedding the target two-dimensional code into the encrypted mask pattern so as to acquire an encrypted two-dimensional code;

acquiring and decoding the encrypted two-dimensional code by a two-dimensional code decoding device so as to acquire the function pattern and the identification of the two-dimensional code;

sending the identification to the server by the two-dimensional code decoding device;

receiving the identification by the server;

sending the key to the two-dimensional code decoding device by the server according to the identification;

receiving by the two-dimensional code decoding device the key sent by the server;

generating the initial mask pattern by the two-dimensional code decoding device according to the function pattern and the identification; and decrypting the encrypted two-dimensional code by the two-dimensional code decoding device according to the key and the initial mask pattern so as to acquire the target two-dimensional code;

wherein, the initial mask pattern is consistent with the target two-dimensional code in size, areas of the mask pattern corresponding to the function patterns of the target two-dimensional code are set to be of a light color, and the function patterns of the target two-dimensional code comprise a position detection pattern, a position detection pattern separator, a positioning pattern, a correction pattern, an auxiliary correction pattern and an identification pattern, "encrypting the initial mask pattern by the two-dimensional code generating device using the key" specifically comprises:

sequentially skipping the areas of the mask pattern corresponding to the function patterns of the target two-dimension code, extracting bit data of the initial mask pattern to form initial data strings, and recording the position and the number of the skipped areas;

encrypting the initial data strings using the key to acquire the encrypted data strings; and sequentially splicing the encrypted data strings and the function areas together to form the encrypted mask pattern according to the position and the number of skipped areas.

2. A method for encrypting and decrypting two-dimensional code mask, characterized by comprising:

generating a target two-dimensional code containing an identification, an initial mask pattern and a key by a two-dimensional code generating device;

sending the identification, the initial mask pattern and the key to a server by the two-dimensional code generating device;

receiving and storing the identification, the initial mask pattern and the key by the server;

encrypting the initial mask pattern by the two-dimensional code generating device using the key and then embedding the target two-dimensional code into the encrypted mask pattern to acquire the encrypted two-dimensional code;

acquiring and decoding the encrypted two-dimensional code by a two-dimensional code decoding device so as to acquire the identification;

sending the identification to the server by the two-dimensional code decoding device;

receiving the identification by the server;

sending the key and the initial mask pattern to the two-dimensional code decoding device by the server according to the identification;

receiving by the two-dimensional code decoding device the key and the initial mask pattern sent by the server; and decrypting the encrypted two-dimensional code by the two-dimensional code decoding device according to the key and the initial mask pattern to acquire the target two-dimensional code;

wherein, the initial mask pattern is consistent with the target two-dimensional code in size, areas of the mask pattern corresponding to the function patterns of the target two-dimensional code are set to be of a light color, and the function patterns of the target two-dimensional code comprise a position detection pattern, a position detection pattern separator, a positioning pattern, a correction pattern, an auxiliary correction pattern and an identification pattern, "encrypting the initial mask pattern by the two-dimensional code generating device using the key" specifically comprises:

sequentially skipping the areas of the mask pattern corresponding to the function patterns of the target two-dimension code, extracting bit data of the initial mask pattern to form initial data strings, and recording the position and the number of the skipped areas;

encrypting the initial data strings using the key to acquire the encrypted data strings; and sequentially splicing the encrypted data strings and the function areas together to form the encrypted mask pattern according to the position and the number of skipped areas.

3. The method for encrypting and decrypting two-dimensional code mask according to claim 1, wherein, the method further comprises establishing a secure channel between the two-dimensional code generating device and the server, specifically comprising:

generating a public key pair and a private key pair by the server and sending the public key pair to the two-dimensional code generating device;

receiving the public key pair by the two-dimensional code generating device;

encrypting an identity ID and a work key by the two-dimensional code generating device using the public key pair and sending the encrypted ID and the encrypted work key to the server;

receiving the encrypted ID and the encrypted work key by the server;

decrypting the encrypted identity ID and the encrypted work key by the server using the private key pair to acquire the identity ID and the work key.

4. The method for encrypting and decrypting two-dimensional code mask according to claim 2, wherein, the method further comprises establishing a secure channel between the two-dimensional code generating device and the server, specifically comprising:

generating a public key pair and a private key pair by the server and sending the public key pair to the two-dimensional code generating device;

receiving the public key pair by the two-dimensional code generating device;

encrypting an identity ID and a work key by the two-dimensional code generating device using the public key pair and sending the encrypted ID and the encrypted work key to the server;

receiving the encrypted ID and the encrypted work key by the server;

decrypting the encrypted identity ID and the encrypted work key by the server using the private key pair to acquire the identity ID and the work key.

5. The method for encrypting and decrypting two-dimensional code mask according to claim 1, wherein, the method further comprises establishing a secure channel between the two-dimensional code decoding device and the server, specifically comprising:

generating a public key pair and a private key pair by the server and sending the public key pair to the two-dimensional code decoding device;

receiving the public key pair by the two-dimensional code decoding device;

encrypting an identity ID and a work key by the two-dimensional code decoding device using the public key pair and sending the encrypted ID and the encrypted work key to the server;

receiving the encrypted ID and the encrypted work key by the server;

decrypting the encrypted identity ID and the encrypted work key by the server using the private key pair to acquire the identity ID and the work key.

6. The method for encrypting and decrypting two-dimensional code mask according to claim 2, wherein, the method further comprises establishing a secure channel between the two-dimensional code decoding device and the server, specifically comprising:

generating a public key pair and a private key pair by the server and sending the public key pair to the two-dimensional code decoding device;

receiving the public key pair by the two-dimensional code decoding device;

encrypting an identity ID and a work key by the two-dimensional code decoding device using the public key pair and sending the encrypted ID and the encrypted work key to the server;

receiving the encrypted ID and the encrypted work key by the server;

decrypting the encrypted identity ID and the encrypted work key by the server using the private key pair to acquire the identity ID and the work key.

7. The method for encrypting and decrypting two-dimensional code mask according to claim 1, wherein, "encrypting the initial mask pattern by the two-dimensional code generating device using the key and then embedding the target two-dimensional code into the encrypted mask pattern to acquire the encrypted two-dimensional code" specifically comprises:

encrypting the initial mask pattern by the two-dimensional code generating device using the key to acquire the encrypted mask pattern;

performing an exclusive-OR operation on the encrypted mask pattern and the target two-dimensional code by the two-dimensional code generating device to acquire the encrypted two-dimensional code;

"decrypting the encrypted two-dimensional code by the two-dimensional code decoding device according to the key and the initial mask pattern to acquire the target two-dimensional code" specifically comprises:

encrypting the initial mask pattern by the two-dimensional code decoding device using the key to acquire the encrypted mask pattern;

performing an exclusive-OR operation on the encrypted mask pattern and the encrypted two-dimensional code by the two-dimensional code decoding device to acquire the target two-dimensional code.

8. The method for encrypting and decrypting two-dimensional code mask according to claim 2, wherein, "encrypting the initial mask pattern by the two-dimensional code generating device using the key and then embedding the target two-dimensional code into the encrypted mask pattern to acquire the encrypted two-dimensional code" specifically comprises:

encrypting the initial mask pattern by the two-dimensional code generating device using the key to acquire the encrypted mask pattern;

performing an exclusive-OR operation on the encrypted mask pattern and the target two-dimensional code by the two-dimensional code generating device to acquire the encrypted two-dimensional code;

"decrypting the encrypted two-dimensional code by the two-dimensional code decoding device according to the key and the initial mask pattern to acquire the target two-dimensional code" specifically comprises:

encrypting the initial mask pattern by the two-dimensional code decoding device using the key to acquire the encrypted mask pattern;

performing an exclusive-OR operation on the encrypted mask pattern and the encrypted two-dimensional code by the two-dimensional code decoding device to acquire the target two-dimensional code.

9. The method for encrypting and decrypting two-dimensional code mask according to claim 1, wherein, the method further comprises: presetting a time threshold and recording a storage duration of the key in the server; not sending the key to the two-dimensional code decoding device by the server, if the storage duration exceeds the time threshold.

10. The method for encrypting and decrypting two-dimensional code mask according to claim 2, wherein, the method further comprises: presetting a time threshold and recording a storage duration of the key in the server; not sending the key to the two-dimensional code decoding device by the server, if the storage duration exceeds the time threshold.

* * * * *